Nov. 22, 1949  B. SHARP ET AL  2,488,833
STACKER DRIVE
Filed Sept. 17, 1946  3 Sheets-Sheet 1
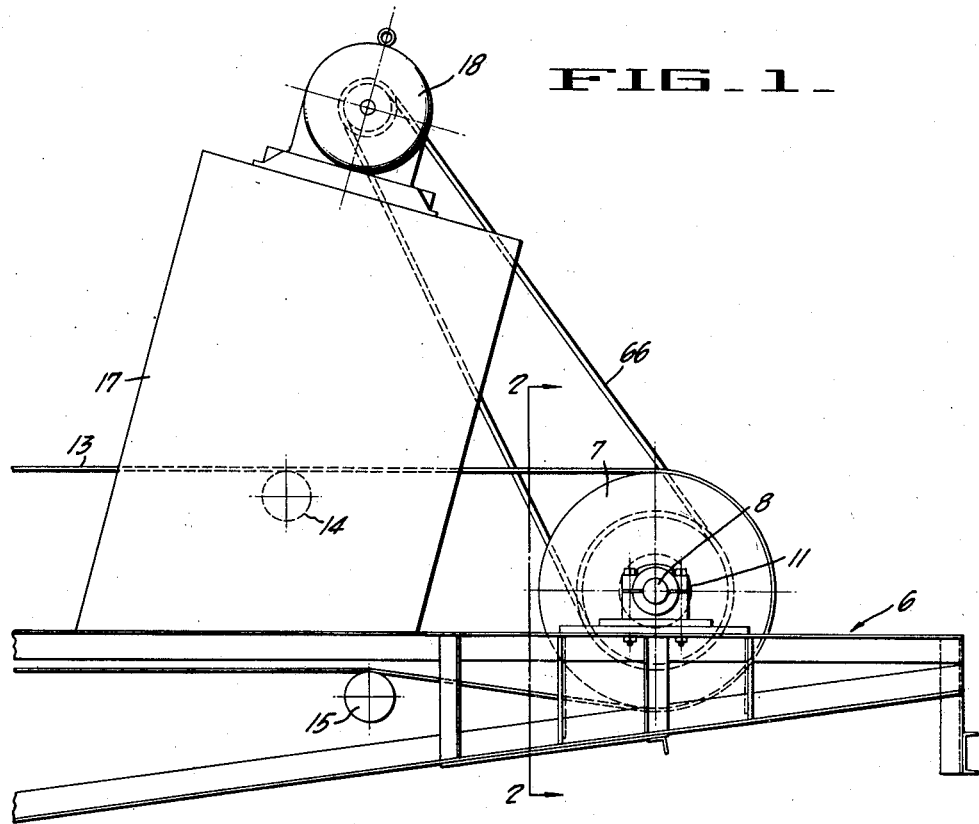
FIG_1_
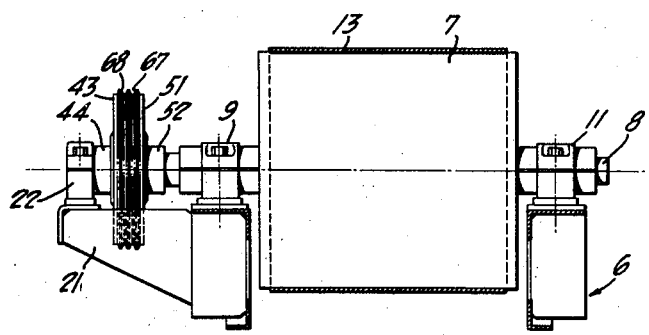
FIG_2_
INVENTORS
Bayard Sharp
Cecil Wilbur Hess
BY

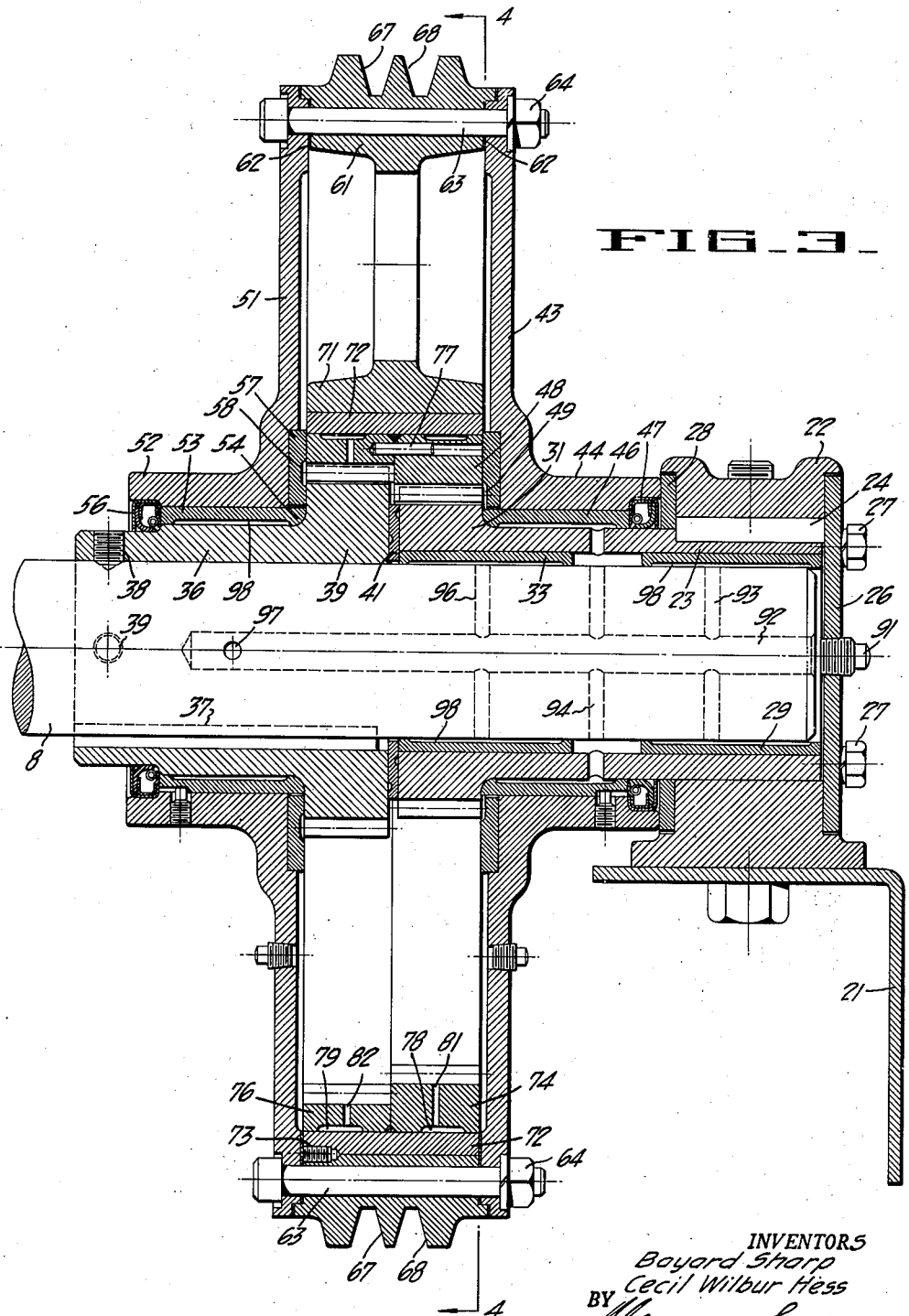
FIG_3_

Nov. 22, 1949      B. SHARP ET AL      2,488,833
STACKER DRIVE
Filed Sept. 17, 1946      3 Sheets-Sheet 3
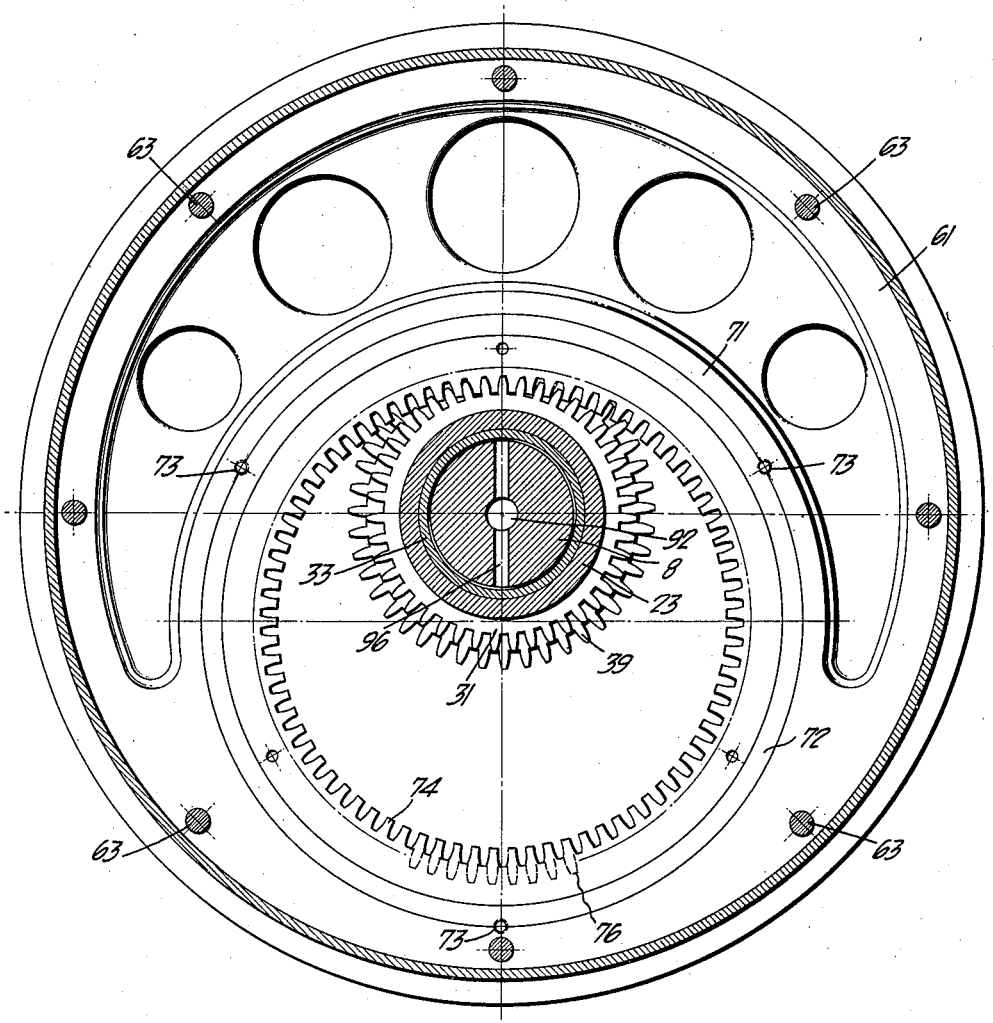
FIG_4_
INVENTORS
Bayard Sharp
Cecil Wilbur Hess
BY Patented Nov. 22, 1949

2,488,833

UNITED STATES PATENT OFFICE 2,488,833

STACKER DRIVE

Bayard Sharp and Cecil Wilbur Hess, Alameda, Calif., assignors to Yuba Manufacturing Company, San Francisco, Calif., a corporation of California Application September 17, 1946, Serial No. 697,498

1 Claim. (Cl. 74—804)

Our invention relates to means for transmitting a driving force from any suitable source such as a prime mover to any power-consuming device and is especially concerned with means for driving the tailings—or stacker—belt of a dredge such as an alluvial dredge. In the usual construction there is afforded a stacker ladder or support which extends a considerable distance from the hull of the dredge and at its outboard end carries a roller or head pulley about which the stacker belt is trained so that the belt conveys tailing material for discharge over the end of the belt. The belt is preferably driven by a high speed prime mover such as an electrical motor mounted on the stacker ladder. It is a problem to provide a suitable power transmission and speed-reducing means between the prime mover and the stacker belt drive.

In the environment mentioned, the drive mechanism is subject to operation in the vicinity of rocks and pebbles and is subject to relatively rough usage and lack of service attention.

It is therefore an object of our invention to provide a stacker drive effective to drive a stacker belt from a suitable source of power.

Another object of the invention is to provide a stacker drive protected from deleterious surrounding conditions.

An additional object of the invention is to provide a stacker drive which can operate for protracted periods with little or no service.

An additional object of the invention is to provide a stacker drive suitable for installation in the awkward environment at the end of a stacker ladder.

Another object of the invention is in general to improve stacker drives.

Other objects together with the foregoing are attained in the embodiment of the invention disclosed in the accompanying drawings in which Figure 1 is a side elevation of a stacker drive installed at the outboard end of a stacker in accordance with our invention.

Figure 2 is a cross section, the plane of which is indicated by the line 2—2 of Figure 1.

Figure 3 is a cross section on a diametral plane through the stacker drive of our invention.

Figure 4 is a cross section, the plane of which is indicated by the line 4—4 of Figure 3.

In its preferred form the stacker drive of our invention is for use on a stacker drive shaft and includes a first gear having a quill portion journaled on the shaft and fixed in a bearing on the stacker framework. A second gear having a sleeve on it encompasses and is fixed to the shaft. Meshing with the first and second gears are third and fourth internal gears fastened together for rotation within an eccentric bearing formed within a drum clamped between first and second enclosing discs. These discs are journaled on the sleeve and on the quill and together with the drum constitute a lubricant-tight housing. A drive engaging means on the periphery of the drum receives power from the prime mover and through the gear reduction contained within the housing appropriately rotates the shaft at the desired rate.

While our stacker drive is suceptible to embodiment in a number of different forms and is also susceptible to numerous variations depending upon the particular environment in which it happens to be installed, it operates satisfactorily in the form shown herein wherein it is located at the outer end of a stacker ladder generally designated 6. This includes a structural framework of the usual shapes to form a foundation or base. Near the outermost end of the framework 6 is a drum or pulley 7 mounted for rotation with a shaft 8 supported in journals 9 and 11 secured to the framework. Trained around the drum 7 is a stacker belt 13 supported at intervals by appropriate idlers 14 and 16 and extending along the ladder in the customary fashion to the dredge hull (not shown).

In the operation of the structure, the upper run of the conveyor or stacker belt 13 carries pebbles and rocks and discarded material from the dredge hull to and over the drum 7 for discharge. In order to rotate the drum the framework carries an extension 17 on which is disposed any suitable prime mover such as an electric motor 18 furnished with power from a suitable source not shown. In order to reduce its weight since it is at the outboard end of the ladder and to improve the nature of the installation, the motor 18 is preferably of the small high-speed type.

For transmitting driving force from the motor to the pulley 7, we provide a stacker driving mechanism particularly illustrated in cross section in Figure 3. The framework 6 is provided with a bracket 21 on the outboard end of which a bearing 22 is secured. The shaft 8 is in axial alignment with and is of sufficient length to extend into the interior of the bearing although the shaft diameter is smaller than the bearing interior diameter.

Encompassing the shaft coaxially and extending into the interior of the bearing is a quill 23 carrying at its outboard end a key 24 engaging the interior of the bearing so that the quill is non-rotatably held. Overlying one end of the quill is a closure plate 26 held in position by fastenings 27 and at the other end of the bearings is a thrust washer 28 suitably recessed and surrounding the quill 23. Interposed between the quill and the shaft is a bushing 29 to reduce friction.

The other end of the quill 23 is enlarged and is formed into a first gear 31 of the spur type having a predetermined number of teeth thereon, for example 32 teeth. This end of the quill likewise surrounds a bushing 33 disposed on the shaft 8 for anti-friction purposes.

Surrounding the shaft is a sleeve 36 closely fitting the shaft and secured thereto by a key 37 as well as a pair of set screws 38 and 39 so that the sleeve is held for rotation with the shaft and against axial translation with respect thereto. The inner end of the sleeve is enlarged and is provided with an integral second gear 39 of the spur type and having, for example, 36 teeth. The first gear 31 and the second gear 39 are separated for free running by a washer 41 which has slight clearance with the shaft.

Encompassing the quill 23 is a first disc 43 having a hub 44 rotatable with respect to the quill on an interposed bushing 46 and provided with an oil-sealing packing 47. In addition the disc 43 is recessed to receive a thrust washer 48 having a cut out or relieved portion 49 to clear the teeth of the first gear 31.

Somewhat similarly, a second disc 51 having a hub 52 surrounds and is journaled on the sleeve 36 with an interposed bushing 53 to afford an anti-friction mounting. The bushing 53 is contoured on its inner end 54 to serve as an end guide for the second gear 39 and is closed at its outer end by an oil seal 56 to retain lubricant against leakage. The second disc 51 is provided with a thrust washer 57 having a relieved or recessed portion 58 adjacent the teeth of the second gear 39.

At their peripheries the first disc 43 and the second disc 51 are comparably enlarged and recessed to be clamped against an interposed drum 61. There are provided thin shims 62 so that the axial spacing of the discs 43 and 51 can be varied. With appropriate shims installed, the discs are clamped against the periphery of the interposed drum by through bolts 63 having suitable fastenings 64 thereon. Since the drum 61 is continuous, it, together with the discs 43 and 51, forms a housing encompassing the first gear 31 and the second gear 39. The periphery of the drum 61 is contoured to cooperate with a driving means. In the present instance it is preferable to provide the motor 18 with a drive by V-belts 66. The drum is formed with a pair of grooves 67 and 68 to receive the belts so that the drum and likewise the discs 43 and 51 are rotated at an appropriate angular velocity.

In order to transmit the rotation of the drum to the shaft 8, the interior of the drum is provided with a relatively large eccentric bearing 71 encompassing the shaft and on its interior surface engages a bushing 72 secured in position by a fastening 73. The bushing serves as a suitable anti-friction mounting for a third gear 74 of the internal tooth type having, for example, 58 teeth, meshing with the first gear 31 and running against the thrust washer 48. Likewise rotatable within the bushing 72 is a fourth gear 76 of the internal tooth type having, for example, 62 teeth, running against the thrust washer 57 and turning in unison with the third gear 74 because it is locked thereto by a pin 77. In order to provide for adequate lubrication of the gear teeth, the outside surfaces of the gears 74 and 76 are provided with circumferential grooves 78 and 79 communicating at appropriate intervals through passages 81 and 82 with the working faces of the gears.

With this arrangement, and since the quill 23 is held stationary in the bearing 22, when the housing, including the drum 61, is rotated, the eccentric bearing 71 is also rotated and the third gear 74 meshing with the first gear 31 is rotated at a lesser angular velocity about its own center. Since the fourth gear 76 is concentric with and fixed to the third gear, it rotates at the same angular velocity and about the same axis as the gear 74. But since the fourth gear 76 is in mesh with the second gear 39, and because of the tooth ratio, the gear 39 is rotated at an angular velocity which is a fraction of the angular velocity of the drum. The shaft 8 rotates with the gear 36 so that the stacker is driven at the desired rate.

In this fashion there is provided a compact stacker drive gear reduction having appropriate wearing surfaces for ultimate renewal, which is itself its own lubricant and gear housing, and serves for long periods without attention. When lubrication is necessary oil is introduced through the cover plate 26 by the removal of an oil filler plug 91 affording access to the interior. To assist in the distribution of the lubricant, the shaft 8 is provided with an axial conduit 92 from which radial branch conduits such as 93 and 94, 96 and 97 lead to appropriate grooves such as 98 in the adjacent bushings and washers. The entire interior of the stacker drive is bathed with lubricant and all of the wear-resistant rubbing surfaces are well supplied with lubricant. Thus the assembly is such that the stacker drive can be operated in a remote location even though subject to severe abuse under adverse conditions for extended periods.

We claim:

A stacker drive comprising a bearing, a shaft coaxial with and extending into said bearing with the end of said shaft within said bearing, a first gear having external teeth and having a quill journaled on said shaft and extending into said bearing with the end of said quill within said bearing, a key fixing said quill in said bearing, a closure plate mounted on said bearing overlying the adjacent ends of said shaft and said quill, a second gear having external teeth and having a sleeve encompassing said shaft, a key fixing said sleeve on said shaft, a third gear eccentrically disposed with respect to and having internal teeth meshing with the external teeth of said first gear, a fourth gear eccentrically disposed with respect to and having internal teeth meshing with the external teeth of said second gear, means for securing said third and fourth gears together, a housing drum concentric with said shaft, driving means on said housing drum, an eccentric bearing in said housing drum for receiving said third and fourth gears, a first disc having a hub journaled on said quill, a second disc having a hub journaled on said sleeve, and means for securing said housing drum and said first and second discs together in driving relationship.

BAYARD SHARP.
CECIL WILBUR HESS.

REFERENCES CITED

The following references are of record in the file of this patent:

UNITED STATES PATENTS

| Number | Name | Date |
|---|---|---|
| 1,305,616 | Norris | June 3, 1919 |
| 1,456,200 | Twomley | May 22, 1923 |
| 1,868,965 | Berryman | July 26, 1932 |
| 2,062,293 | Cashman | Dec. 1, 1936 |
| 2,413,763 | Heyer | Jan. 7, 1947 |

FOREIGN PATENTS

| Number | Country | Date |
|---|---|---|
| 485,674 | Great Britain | May 26, 1938 |